(12) United States Patent
Lazowski et al.

(10) Patent No.: US 7,401,690 B2
(45) Date of Patent: Jul. 22, 2008

(54) DAMPED CLUTCH PLATE SYSTEM AND METHOD

(75) Inventors: Jeff Lazowski, Chicago, IL (US); Eric Denys, Ann Arbor, MI (US)

(73) Assignee: Material Sciences Corporation, Elk Grove, IL (US)

( * ) Notice: Subject to any disclaimer, the term of this patent is extended or adjusted under 35 U.S.C. 154(b) by 297 days.

(21) Appl. No.: 11/218,908

(22) Filed: Sep. 2, 2005

(65) Prior Publication Data
US 2007/0051578 A1 Mar. 8, 2007

(51) Int. Cl.
*F16D 13/64* (2006.01)
(52) U.S. Cl. .............. 192/30 V; 192/107 R; 192/107 C
(58) Field of Classification Search ........................ None
See application file for complete search history.

(56) References Cited

U.S. PATENT DOCUMENTS 3,221,853 A * 12/1965 Batchelor et al. ........ 192/70.14
3,231,058 A * 1/1966 Batchelor et al. ........ 192/107 R
5,662,199 A * 9/1997 Chevallier ................ 192/107 C
5,939,179 A * 8/1999 Yano et al. .................. 428/212

FOREIGN PATENT DOCUMENTS

JP            04344230 A * 11/1992

* cited by examiner

*Primary Examiner*—Richard M Lorence
(74) *Attorney, Agent, or Firm*—Quinn Law Group, PLLC; Christopher W. Quinn; Nayyer Siddiqi

(57) ABSTRACT

The invention seeks to minimize the vibration and noise in a clutch plate system, by damping either or both the clutch plate and pressure plate with the use of various engineered viscoelastic materials. A clutch plate assembly is provided, comprising a plate body having a first surface and a second surface. In a first embodiment of the invention, the plate body is formed from a laminated sheet structure including two layers of steel having a viscoelastic core between the two layers and coextensive with the two layers. The viscoelastic core may be tunable to damp at different temperatures. In a second embodiment of the invention, an engineered viscoelastic material is used as a layer of bonding material for the first and second surface of the plate body. A method for damping a clutch plate assembly is provided.

14 Claims, 2 Drawing Sheets

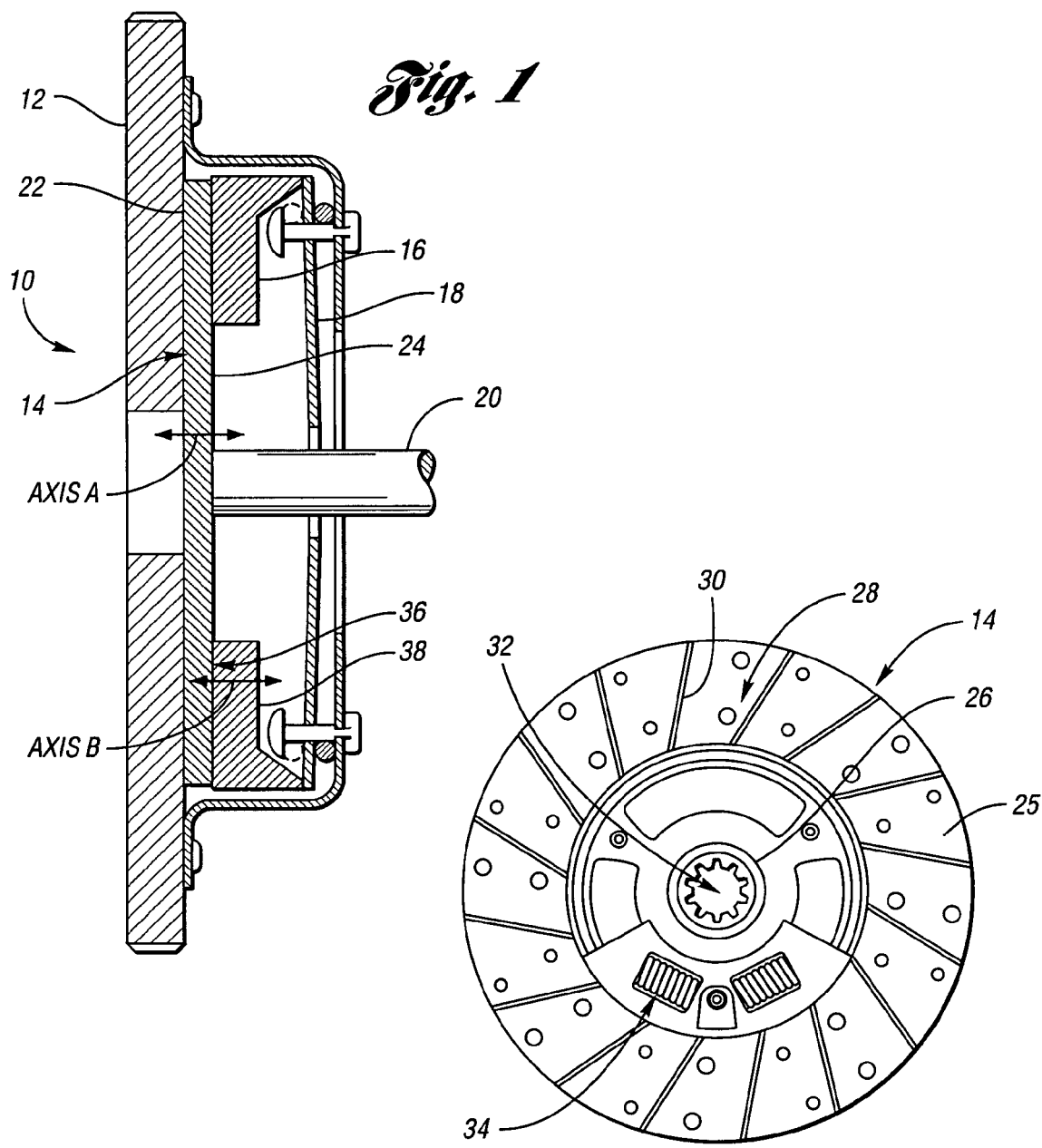

DAMPED CLUTCH PLATE SYSTEM AND METHOD

TECHNICAL FIELD

The present invention relates to a damped clutch plate system, comprising a laminated steel structure with a viscoelastic layer designed for noise reduction and vibration damping.

BACKGROUND OF THE INVENTION

A clutch is typically used to connect or disconnect power from one functioning part of a vehicle to another. In a vehicle, a clutch is used to control transfer of engine power. The clutch disengages the engine and transmission as the gears are shifted and allows the engine to be operational when the wheels are stopped.

A clutch typically comprises of a flywheel, clutch plate, pressure plate assembly and various linking mechanisms. Vibrations leading to noise, also known as shutter, occur when the clutch plate and the flywheel are spinning at different speeds with respect to each other. As the clutch plate and flywheel spin at different speeds, two or more components in the system couple together and begin to vibrate as a new system. In such cases, the damping in the system is very low. If the energy input from friction is greater than the system damping can dissipate, instability in the system occurs and leads to undesirable vibration.

SUMMARY OF THE INVENTION

The present invention seeks to minimize the vibration and noise in a clutch plate system, by damping either or both the clutch plate and pressure plate with the use of various engineered viscoelastic materials.

In this invention a clutch plate assembly is provided, comprising a plate body having a first surface and a second surface. A first layer of bonding material is in contact with the first surface and at least one layer of friction material is in contact with the first layer of bonding material. A second layer of bonding material is in contact with the second surface and at least one layer of friction material is in contact with the second layer of bonding material.

In a first embodiment of the invention, the plate body is formed from a laminated sheet structure including two layers of steel having a viscoelastic core between the two layers and coextensive with the two layers. The viscoelastic core may be tunable to damp at different temperatures. The plate body is configured to provide optimal damping of vibration at the operating temperature of the clutch assembly, which is typically between approximately 60 and 100 degrees F.

In a second embodiment of the invention, a plate body with a first surface and second surface is provided. A first layer of bonding material is in contact with the first surface. A second layer of bonding material is in contact with the second surface. The first and second layer of bonding material is made of an engineered viscoelastic material. The engineered viscoelastic material is used to bond at least one layer of friction material to the first surface and at least one layer of friction material to the second surface of the plate body.

In a third embodiment of the invention, the features of the first and second embodiment are combined. The first and second layer of bonding material is made of an engineered viscoelastic material, as in the second embodiment. Additionally, the plate body is formed from a laminated sheet structure including two layers of steel having a viscoelastic core between the two layers and coextensive with the two layers, as in the first embodiment. A method for damping a clutch plate assembly is also provided.

The above features and advantages, and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic sectional view of an improved clutch system in accordance with this invention;

FIG. 2 is an elevational view of a typical clutch plate in the improved clutch system;

FIG. 3 is an elevational view of a typical pressure plate in the improved clutch system;

DESCRIPTION OF THE PREFERRED EMBODIMENTS

Figure 4:
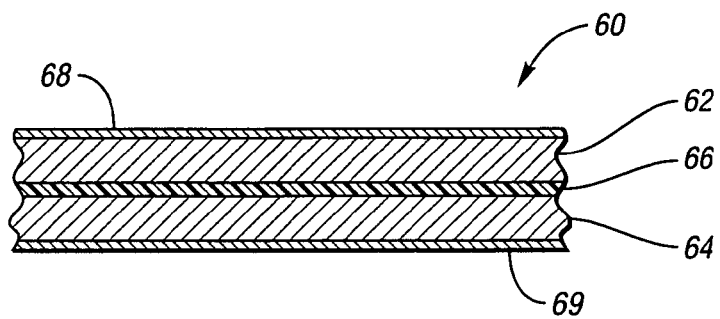
FIG. 4 is a fragmentary schematic cross sectional view of a laminated sheet structure for use with the improved clutch system, through axis A for the clutch plate and axis B for the pressure plate, as shown in FIG. 1.

FIG. 1 illustrates a schematic sectional view of an improved clutch system 10. The clutch system 10 typically comprises of at least a flywheel portion 12, clutch plate portion 14 and pressure plate portion 16. The clutch system 10 shown in FIG. 1 may employ a diaphragm spring portion 18. Coil springs (not shown) may also be used. The flywheel portion 12 and pressure plate portion 16 are adapted to be connected directly to the engine (not shown) for rotation in response to engine operation. The clutch plate portion 14 is mounted with respect to a transmission input shaft 20 for selectively drivably rotating the shaft 20 when the pressure plate portion 16 and clutch plate portion 14 are selectively engaged. The flywheel portion 12 and pressure plate portion 16 may also provide thermal absorption for the friction operation of the clutch system 10.

FIG. 2 illustrates a typical clutch plate portion 14. The clutch plate portion 14 is generally circular with two planar surfaces 22 and 24, as shown in FIG. 1. The clutch plate portion 14 is covered on both planar surfaces 22 and 24 with friction material 25. The friction material 25 may be bonded or riveted onto the planar surfaces 22 and 24 with a layer of bonding material. The clutch plate portion 14 is typically constructed of thin steel, with a splined hub 26. The splined hub 26 engages mating splines on the transmission input shaft 20. The outer portion 28 of the clutch plate portion 14 is split into segments 30 to aid in smoothly engaging with other parts or portions of the clutch system 10. The splined hub 26 is attached to the outer portion 28 of the clutch plate portion 14 to enable circular movement of the splined hub 26 with respect to the outer portion 28 of the clutch plate portion 14, about the center 32 of the clutch plate portion 14. The clutch plate portion 14 may have springs 34 to act as a cushion when the clutch plate portion 14 is pressed against and engages against the flywheel 12.

FIG. 3 illustrates a typical pressure plate portion 16. The pressure plate portion 16 is generally circular with first and second planar surfaces 36 and 38, see FIG. 1. The first planar surface 36 is smooth and presses the clutch plate portion 14 against the flywheel portion 12. The second planar surface 38 may have different shapes or configurations to enable attachment of springs and other mechanisms thereto. The pressure plate portion 16 may be made of a thick piece of metal for maximum heat absorption.

Figure 5:
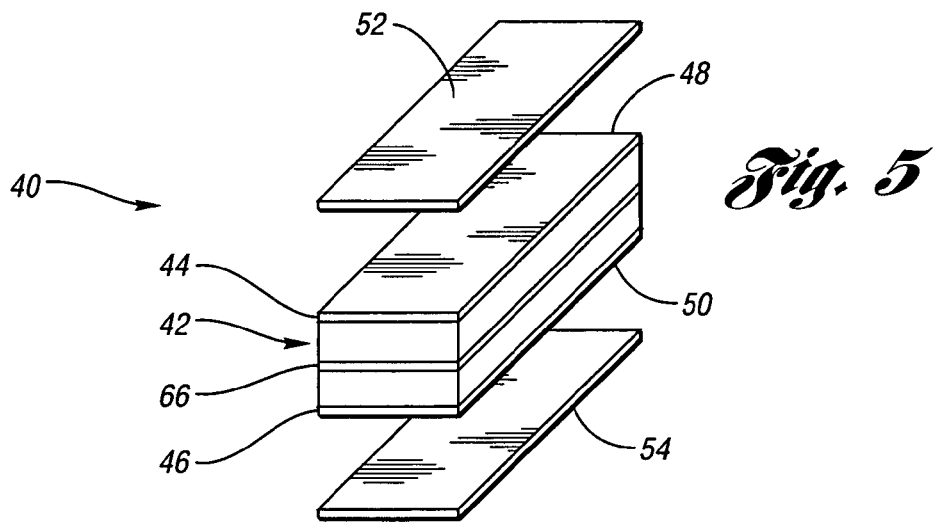
FIG. 5 is an exploded perspective view of a portion of the clutch plate of FIG. 2 formed from the laminated sheet structure of FIG. 4 in accordance with a first embodiment of the present invention.

FIG. 5 is an exploded perspective view of a clutch plate portion 40 formed in accordance with the first embodiment of the present invention. Referring to FIG. 5, the clutch plate portion 40 has a plate body 42, having a first surface 44 and a second surface 46. A first layer of bonding material 48 is in contact with the first surface 44 of the plate body 42 and a second layer of bonding material 50 is in contact with the second surface 46. A first layer of friction material 52 is in contact with the first layer of bonding material 48. A second layer of friction material 54 is in contact with the second layer of bonding material 50. Each bonding layer bonds the respective friction layer to the respective surface of the plate body 42. The pressure plate portion 16 may also be constructed using the structure described above.

In a first embodiment of the invention, the plate body 42 is formed from a laminated sheet vibration damping structure 60, also known as a constrained layer viscoelastic material. The vibration damping structure 60 is more fully described in U.S. application Ser. No. 11/015,493 filed Dec. 17, 2004 which is commonly assigned with this application and which is hereby incorporated by reference in its entirety. A schematic cross sectional view of such laminated sheet structure for use with the present invention is shown in FIG. 4. The cross-sectional view in FIG. 4 is through axis A for the clutch plate portion 14 and axis B for the pressure plate portion 16, as shown in FIG. 1. This laminated sheet structure is available under the product name Quiet Steel® from Material Sciences Corporation of Farmington Hills, Mich. The laminated sheet structure 60 includes first and second sheets of steel 62, 64 having an engineered viscoelastic core 66 therebetween spanning the entirety of both steel sheets 62, 64, as shown in FIG. 4. The steel sheets used may be cold rolled steel or other suitable materials. The laminated steel sheet structure 60 for use in combination with the damped clutch plate system of this invention is preferably 0.042" to 0.048" (1.0 to 1.3 mm) thick prior to cold forming. The viscoelastic core 66 of the Quiet Steele plate in this invention is a viscoelastic material which is designed to damp vibration. The viscoelastic core 66 can be tuned to damp at different temperatures. The viscoelastic core 66 is configured to provide optimal damping of vibration at the operating temperature of the clutch assembly, which is typically between approximately 60 and 100 degrees F. This will increase significantly the damping of the clutch plate portion 14, and will reduce or eliminate the shutter. A coating 68, 69 is provided on both of the steel sheets 62, 64 for corrosion resistance. Electro galvanized coating or other suitable corrosion-resistant coatings may be used. Ordinary adhesive such as phenolic resin may be used for the first and second layer of bonding material 48 and 50, in the first embodiment of the invention.

Figure 6:
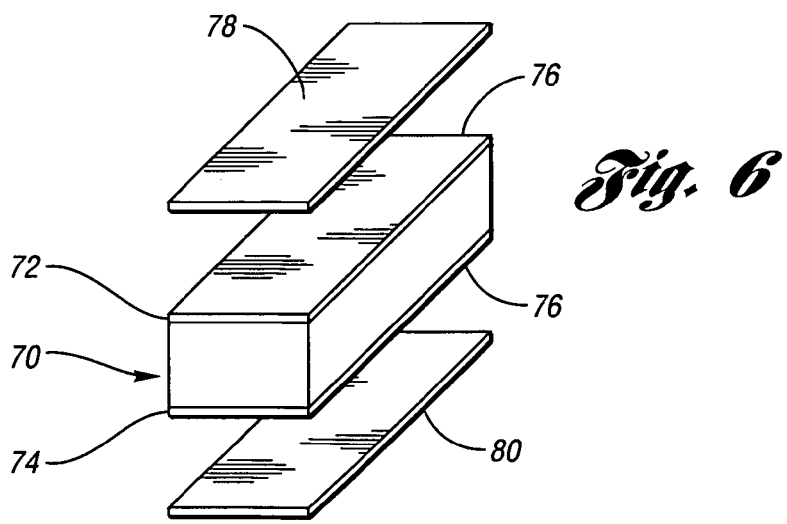
FIG. 6 is an exploded perspective view of a portion of the clutch plate of FIG. 2 formed from a laminated sheet structure in accordance with a second embodiment of the present invention.

In a second embodiment of the invention, as shown in FIG. 6, a plate body 70, with a first surface 72 and second surface 74, is configured for use on the clutch plate portion 14 or pressure plate portion 16. A first layer of bonding material is in contact with the first surface 72. A second layer of bonding material is in contact with the second surface 74. The bonding material used is an engineered viscoelastic material 76. The engineered viscoelastic material 76 is used to bond at least one layer of friction material 78 to the first surface 72. The engineered viscoelastic material 76 is used to bond at least one layer of friction material 80 to the second surface 74 of the plate body 70. The thickness of the viscoelastic material 76 is preferably 0.001" to 0.005". The viscoelastic material 76 has higher damping than ordinary adhesive such as phenolic resin, and will reduce vibrations and noise. The viscoelastic material 76 can be tuned to damp at different temperatures.

In a third embodiment of the invention, the features described in the first and second embodiment are combined. A plate body 70, with a first surface 72 and second surface 74, is configured for use on the clutch plate portion 14 or pressure plate portion 16. A first layer of bonding material is in contact with the first surface 72. A second layer of bonding material is in contact with the second surface 74. As in the second embodiment of the invention, the first and second layer of bonding material is made of an engineered viscoelastic material 76. Additionally, in the third embodiment of the invention, the plate body 70 is formed from a laminated sheet structure 60 including two layers of steel having a viscoelastic core 66 between the two layers and coextensive with the two layers, as in the first embodiment and illustrated in FIG. 4.

A method for damping a clutch plate assembly is provided. A plate body is provided, having a first surface and a second surface. A first layer of bonding material is applied to the first surface, to bond a first layer of friction material to the first surface. A second layer of bonding material is applied to the second surface, to bond a second layer of friction material to the second surface.

While the best modes for carrying out the invention have been described in detail, those familiar with the art to which this invention relates will recognize various alternative designs and embodiments for practicing the invention within the scope of the appended claims.

The invention claimed is:

1. A clutch plate assembly comprising:
    a plate body, having a first surface and a second surface;
    a first layer of bonding material in contact with said first surface;
    at least one layer of friction material in contact with said first layer of bonding material;
    wherein said plate body is formed from a laminated sheet structure including two layers of steel having a viscoelastic core therebetween spanning the entirety of both steel layers; and
    wherein said plate body is configured to provide optimal damping of vibration at an operating temperature of the clutch assembly between approximately 60 and 100 degrees F.

2. The clutch plate assembly of claim 1, further comprising:
    a second layer of bonding material in contact with said second surface;
    at least one layer of friction material in contact with said second layer of bonding material.

3. The clutch plate assembly of claim 1, wherein said first layer of bonding material is made of a viscoelastic material.

4. The clutch plate assembly of claim 2, wherein said second layer of bonding material is made of a viscoelastic material.

5. The clutch plate assembly of claim 1, wherein said viscoelastic core is tunable to damp at different temperatures.

6. The clutch plate assembly of claim 1, further comprising a corrosion-resistant coating on each of said two layers of steel for corrosion resistance.

7. The clutch plate assembly of claim 1, wherein said plate body is a clutch plate.

8. The clutch plate assembly of claim 1, wherein said plate body is a pressure plate.

9. The clutch plate assembly of claim 3, wherein the thickness of said viscoelastic material is approximately 0.001 to 0.005 inches.

10. The clutch plate assembly of claim 1, wherein the thickness of said laminated sheet structure is approximately 0.042 to 0.048 inches.

11. A method of forming a damped clutch plate assembly, the method comprising:

provRiding a plate body, having a first surface and a second surface;

applying a first layer of bonding material in contact with said first surface;

applying a first layer of friction material in contact with said first layer of bonding material;

applying a second layer of bonding material in contact with said second surface;

applying a second layer of friction material in contact with said second layer of bonding material;

forming said plate body with a laminated sheet structure including two layers of steel having a viscoelastic core therebetween spanning the entirety of both steel layers, wherein said laminated sheet structure is formed into a plate body having a first surface and a second surface; and wherein said plate body is configured to provide optimal damping of vibration at an operating temperature of the clutch assembly between approximately 60 and 100 degrees F.

12. The method of claim 11:

wherein said first layer of bonding material is made of a viscoelastic material; and wherein said second layer of bonding material is made of a viscoelastic material.

13. The method of claim 11, wherein said viscoelastic core is tunable to damp at different temperatures.

14. The method of claim 11, further comprising a corrosion-resistant coating on each of said two layers of steel for corrosion resistance.

* * * * *